United States Patent [19]

Delattore

[11] Patent Number: 5,515,039
[45] Date of Patent: May 7, 1996

[54] SURFACE/DOWNHOLE PRESSURE RECORDING SYSTEM

[75] Inventor: Leroy C. Delattore, Sugar Land, Tex.

[73] Assignee: Panex Corporation, Sugar Land, Tex.

[21] Appl. No.: 277,081

[22] Filed: Jul. 19, 1994

[51] Int. Cl.⁶ .................................................. G01V 3/00
[52] U.S. Cl. ........................ 340/854.9; 340/856.3; 340/855.8; 340/853.9
[58] Field of Search ................... 340/854.9, 856.3, 340/855.8, 853.9; 166/250

[56] References Cited

U.S. PATENT DOCUMENTS 4,216,536  8/1980  More .................................. 367/83
5,243,337  9/1993  Beauducel et al. ............. 340/855.3

*Primary Examiner*—J. Woodrow Eldred
*Attorney, Agent, or Firm*—Donald H. Fidler

[57] ABSTRACT

A system for the output of data on a two wire cable system from a downhole well tool which has a system with sensor devices, a processor, a clock, a memory and a voltage/current communications device which are all powered by a d.c. battery to a surface read-out where the downhole well tool is actuated for cable transmission of data during operation by an additional power source which is provided from a surface power source so that failure of the cable transmission does not affect the well tool collection of data.

10 Claims, 4 Drawing Sheets

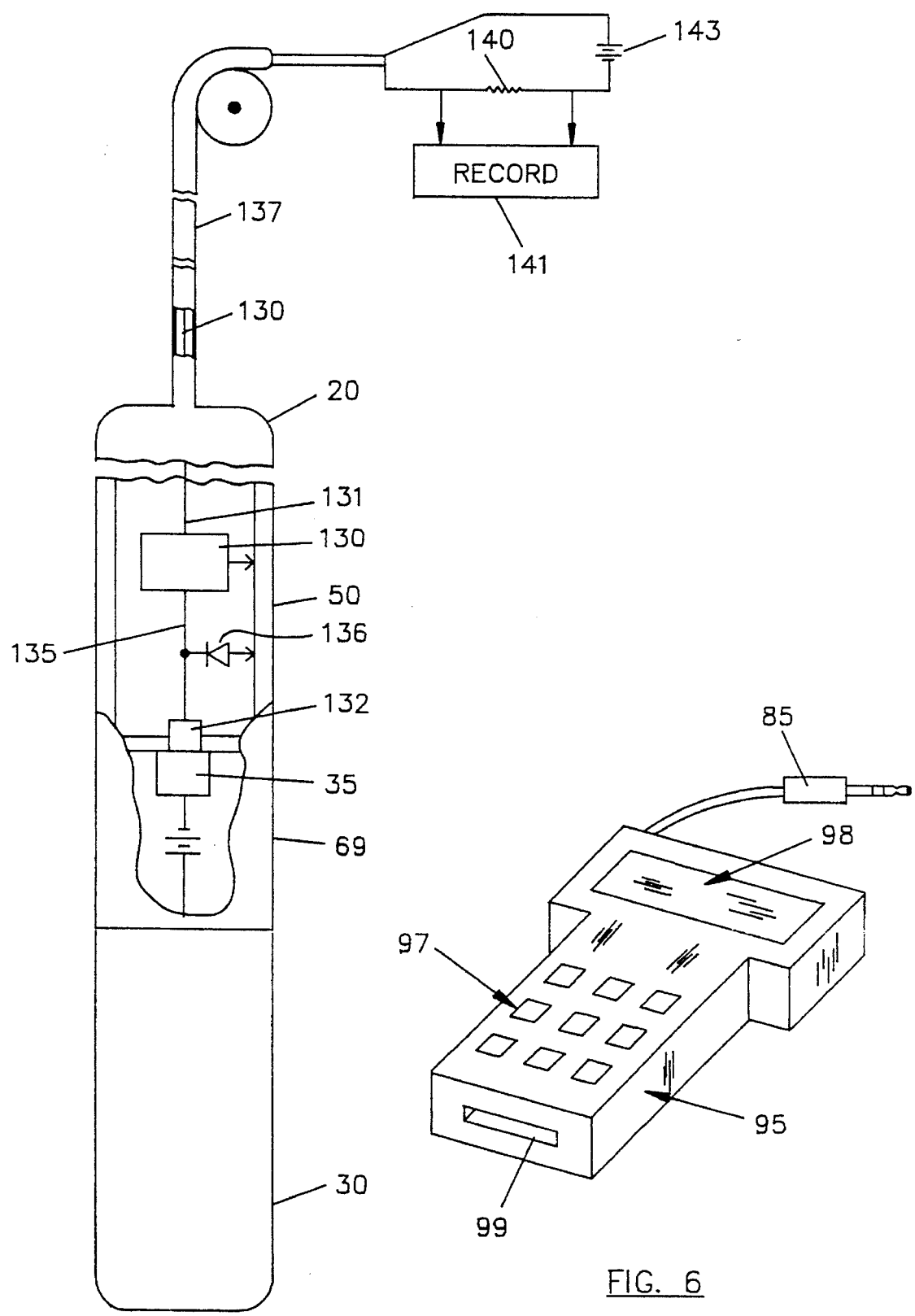

SURFACE/DOWNHOLE PRESSURE RECORDING SYSTEM

FIELD OF THE INVENTION

This invention relates to pressure measuring systems for use in well bores, and more particularly, to well tools which can be utilized to obtain a surface readout of downhole data and also obtain a downhole memory recording of data with a single pressure measuring tool.

BACKGROUND OF THE INVENTION

At present, downhole pressure measuring systems utilized in a well bore include two general types, i.e. a Surface Recording Operation (SRO) type and a downhole Memory Recording Operation (MRO) type.

In an SRO, the downhole tool includes a downhole pressure/temperature sensing system which is powered by a surface located d.c. power source through an electric two conductor cable. The pressure\temperature data are measured in a downhole system and the data is transmitted to and displayed or recorded at the surface. The problem with the SRO is that the cablehead connecting the cable to the well tool electrically fails (because of well fluid leakage and contamination) on a frequent basis so that the tool malfunctions or shuts down and does not recover data during the shut-down. Pressure/temperature tests in a well bore can extend from one day to several weeks and a malfunction can result in serious delay, interruption and expense in obtaining the desired data.

In an MRO, the downhole tool is pressure sealed in an enclosure and is powered by d.c. batteries. The pressure/temperature data is collected in a memory in the tool over a period of time. Subsequently when the tool is recovered to the surface, the data is read out of the memory at that time. A system for data read out is disclosed in U.S. Pat. No. 4,763,259, issued Aug. 09, 1988 and in U.S. Ser. No. 08/020,393, filed Feb. 22, 1993. Since the tool is suspended in the well bore with a non-electrical slick line, if the tool malfunctions while in the well bore, or fails to operate properly there is no surface indication of the malfunction, and the malfunction will not be discovered until the tool is retrieved after the period of testing.

Because of the forgoing problems some operators have utilized two separate tools, an SRO tool and an MRO tool in tandem where an MRO tool is merely attached to the lower end of a SRO tool. If both tools are working, data is recovered at the surface with the SRO and also recovered downhole in the memory of the MRO. If the SRO fails, the operator then hopes, but does not know, if the MRO was functioning before, at or after the time that the SRO fails. This approach to overcoming deficiencies of a SRO tool requires the use and expense of two separate tools which results in a long tool and requires the expense of excess equipment including two pressure sensors.

SUMMARY OF THE INVENTION

In the present, an MRO well tool for measuring temperature and pressure in a well bore has an enclosed pressure sealed tool housing. In the housing is an electronic data communication system which can be operated to transmit and receive data on a two wire system where an applied voltage above a given voltage threshold level initiates the data communication system and where a voltage below the given voltage threshold level is used to operate the tool system to collect data.

In the MRO tool, a d.c. battery pack provides a d.c. power source below the given voltage threshold level to operate the tool system which includes a CPU to operate according to input instructions and a memory bank to collect data. Connected to the MRO tool is an enclosed pressure sealed communications housing which is connected to a two conductor electrical cable (mono-cable) by a cable head. The cable extends to a surface located d.c. power supply and a read-out system.

The communications housing encloses a voltage regulator and diode which are connected by a phone plug and phone jack to the battery pack in the MRO tool so that the communications housing and tool housing are pressure sealed (liquid tight). The CPU in the MRO tool is preset in a cable communication mode at the surface by a CPU instruction prior to use whereby a small voltage increment supplied from the surface power source is additive to the battery voltage to raise the applied voltage above the given voltage threshold level to operate the communication system in the tool in a cable communication mode. While in the cable communication mode, the memory bank also records data at the same time that data is transmitted through the cable to the surface read out display or recording. Thus, the tool collects data in the memory bank irrespective of the additive voltage on the cable by virtue of the downhole battery power and a surface read out is obtained by use of the additive voltage. This enables the operator to ascertain that the MRO is functioning and to obtain current data because there is a surface read out from the MRO tool. Should the electrical cable connection or the cable head electrically fail, the operator at least will know that the MRO tool was functioning at the time of failure. Failure of a cable head does not affect the functioning of the MRO tool. With a two tool system there is no indication that the MRO is functioning and two transducers are required.

THE DRAWINGS

Figure 5:
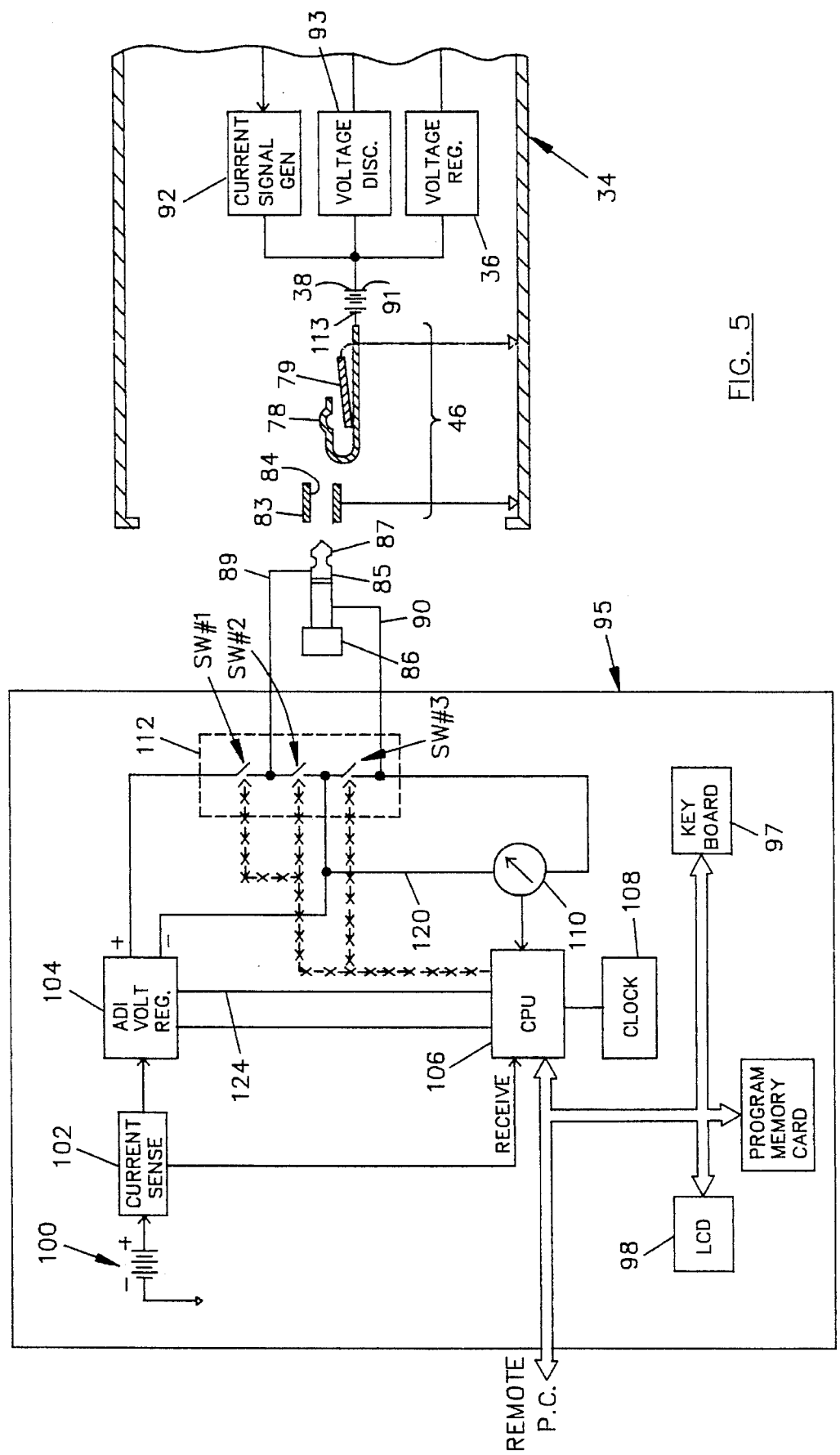

FIG. 5 schematically illustrates an electronic system for read-out of data with the tool at the earth's surface;

FIG. 6 is a perspective view of a hand held unit for the illustration of FIG. 5; and FIG. 7 is a schematic of the system embodying the present invention.

DESCRIPTION OF THE INVENTION

Figures 1, 2:
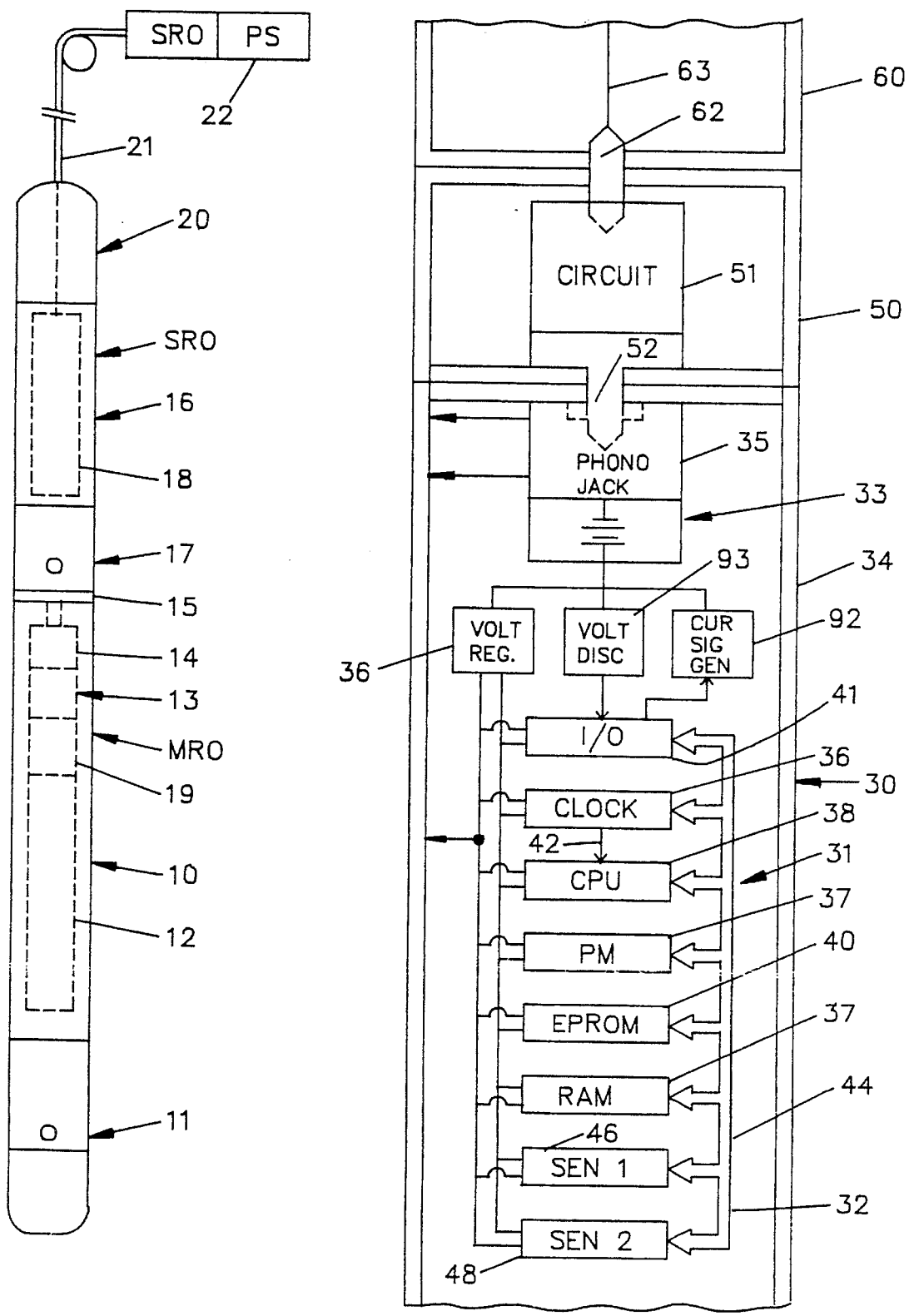
FIG. 1 illustrates a prior art combination of a SRO tool with an MRO tool.
FIG. 2 illustrates schematically an overall sensor system embodying the present invention.

Referring now to FIG. 1, a prior art system using two tools is illustrated. An MRO tool 10 includes a pressure transducer 11, an electronics section 12, a d.c. battery pack 13 and a phone plug outlet 14. With a blank connecting sub or housing 15, the tool is a complete separate and enclosed pressure sealed unit. In the housing 15 is a memory system to record data downhole for subsequent read out when the tool is retrieved to the earth's surface. Connected to the upper end of the MRO tool 10 is an SRO tool 16 which includes a pressure transducer 17, an electronics section 18, and a cablehead assembly 20. The SRO tool 16 is an enclosed pressure sealed unit. The cablehead assembly 20 electrically connects a conductor cable 21 to a surface located surface read out and a d.c. power supply 22 and is attached mechanically to the SRO tool 16.

In the MRO tool 10, the battery pack 13 provides (by way of an exemplary reference value) 18 volts d.c. and an instruction in the CPU 19 places the electronics section 12 in a collection mode to collect pressure data in a memory means. When the MRO tool 10 is removed from the well bore after a test, it is disconnected from the SRO and the blank sub 15 is removed to access the phone plug outlet 14 in the MRO tool. A d.c. power source is then connected through the phone plug outlet 14 (after disassembly of the sub 15) to supply (by way of an exemplary reference value) an additional 8 volts which raises the voltage level in the electronics section and the CPU 29 places the tool to a transmission mode. The communication system in the tool has a threshold level (for example, 22 volts) and an operating voltage level below the threshold voltage level operates the system to collect data and to receive input instruction. When the voltage level to the system is above the threshold voltage level, the communication system can transmit and receive data. The transmission of the collected data is accomplished by current modulation. Voltage modulation is utilized to input instruction data. The collected data in a memory bank is retrieved from the MRO tool when it is retrieved from the well bore after the test by supplying the additional voltage to place the communication system in a transmit mode which will then respond to data retrieval commands.

In the SRO tool, while in the well bore, the surface power supply 22 supplies 28 volts for the electronics section 18 to collect and transmit data. The data is transmitted by current modulation to the earth's surface for a surface read out. It can be appreciated that an electrical failure of the cablehead 20 which disables the power supply to the electronics section 18 will cause a SRO tool to malfunction.

Referring now to FIG. 2, the present invention is illustrated in a downhole tool 30 suitable for use in a production well for measuring temperature and pressure in the well bore over a period of time. The tool 30 can include one or more separate pressure and liquid tight housings for enclosing electronics system 31, a sensor system 32, and a battery pack system 33. The tool is typically sized for passage through a small diameter production tubing. The battery pack 33 may consist of a number of dry cell batteries arranged end to end or a battery pack. The system is pressure sealed and the battery pack 33 has a positive terminal electrically coupled to the electrical processing circuits within a tool housing 34. A negative terminal of the battery pack is connected to the housing 34 through a phone jack 35 to provide an electrical ground for the entire tool. Ordinarily, in an MRO tool the housing 34 is threadedly attached to a blank cable housing which seals off the upper end of the tool.

By housing the battery pack 33 and the electrical processing circuits in an enclosed pressure tight housing, the processing circuits are never exposed to the well bore environment and need not be disassembled for read-out of data. A similar system is disclosed in U.S. Ser. No. 08/020, 393, filed Feb. 22, 1993 and in U.S. Pat. No. 4,763,259, issued Aug. 09, 1988.

In the electronics system 31 is a voltage regulator 36 which provides a regulated operating voltage to the various circuits requiring power from the d.c. battery voltage. A clock 36 is an electronic device which functions over a period of time to periodically control the application of power to the downhole processing equipment in accordance with a preselected set of preinstalled software recording instructions in a CPU 38. Each recording instruction enables measuring and memory circuits to operate for a predetermined time period (which determines the number of samples to be obtained) and to be turned off for discrete time intervals as determined by the sample rate until the completion of the test. The time periods and time intervals can be independently set for a range or number of the program instructions. The program instructions are used where each program recording instruction establishes a time sequence for sampling a predetermined number of pressure and temperature data samples and the time interval or sampling rate taking of samples. This enables conservation of power and permits relatively long periods of use in a well bore.

As discussed, the clock 36 controls the application of operating power to the system. The clock connects to the power supply and enables operating power to be applied to a random access memory (RAM) circuit means 37, the central processing unit (CPU) circuit means 38, a program non-volatile memory (PM) circuit means 39, a non-volatile data memory means 40 (EPROM) and input-output (I/O) circuit means 41. The clock 36, the RAM 37, the CPU 38, the memory 39 and 40, the I/O 41, and sensors 32 are all interconnected by a data bus 44 which interrelates the programmed functions and data transfer for the various units. The sensors 32 can include a first sensor 46, such as a pressure sensor and a second sensor 48, such as a temperature sensor which are coupled to the I/O circuit 41 and the signal data from the sensors can be in a digital format or converted to a digital format.

In operation of the system, the clock means 36 controls the period of time that the various units are turned off and on. The clock means 36 are operated by the program instructions which are input to the CPU 38 at the earth's surface prior to running the tool. The program instructions are a series of commands to operate software to control the operation of the equipment for the discrete number of sampling periods and to set the time intervals between each sampling period. In each sampling period of an instruction, samples for each of the temperature and pressure data are obtained and the number of samples of each data sample is established by the instruction. The recording program instructions thus serve to direct the operating functions of the CPU to obtain data samples. A flow chart for the recording program instructions and further explanation of the system is shown in FIGS. 2A, 2C of U.S. Pat. No. 4,763,259 and is incorporated herein.

The well tool 30 is connected at its upper end to a communications housing 50. The housing 50 is, in turn connected to a cable connector 60. The cable connector 60 and the housing 50 are threadedly coupled and pressure sealed with respect to one another. The housing 50 and the housing 34 are threadedly coupled and pressure sealed with respect to one another. The cable connector 60 is conventional and connects to a two wire cable such as a shielded mono-cable. Such cable connectors have a significant failure rate to fluid leakage to their interior which leads to electrical malfunctions.

In the pressure sealed communication housing 50 is a circuit means 51 which provides an additional voltage to the battery pack voltage to place the MRO in a communication or transmit mode. The circuit means 51 includes a phone plug connector 52 for coupling to the phone jack in the MRO 30. The circuit means 51, in turn is connected by a high pressure connector probe 62 in the cable connector 60 to a conductor wire 63 in the cable.

Figures 3, 4:
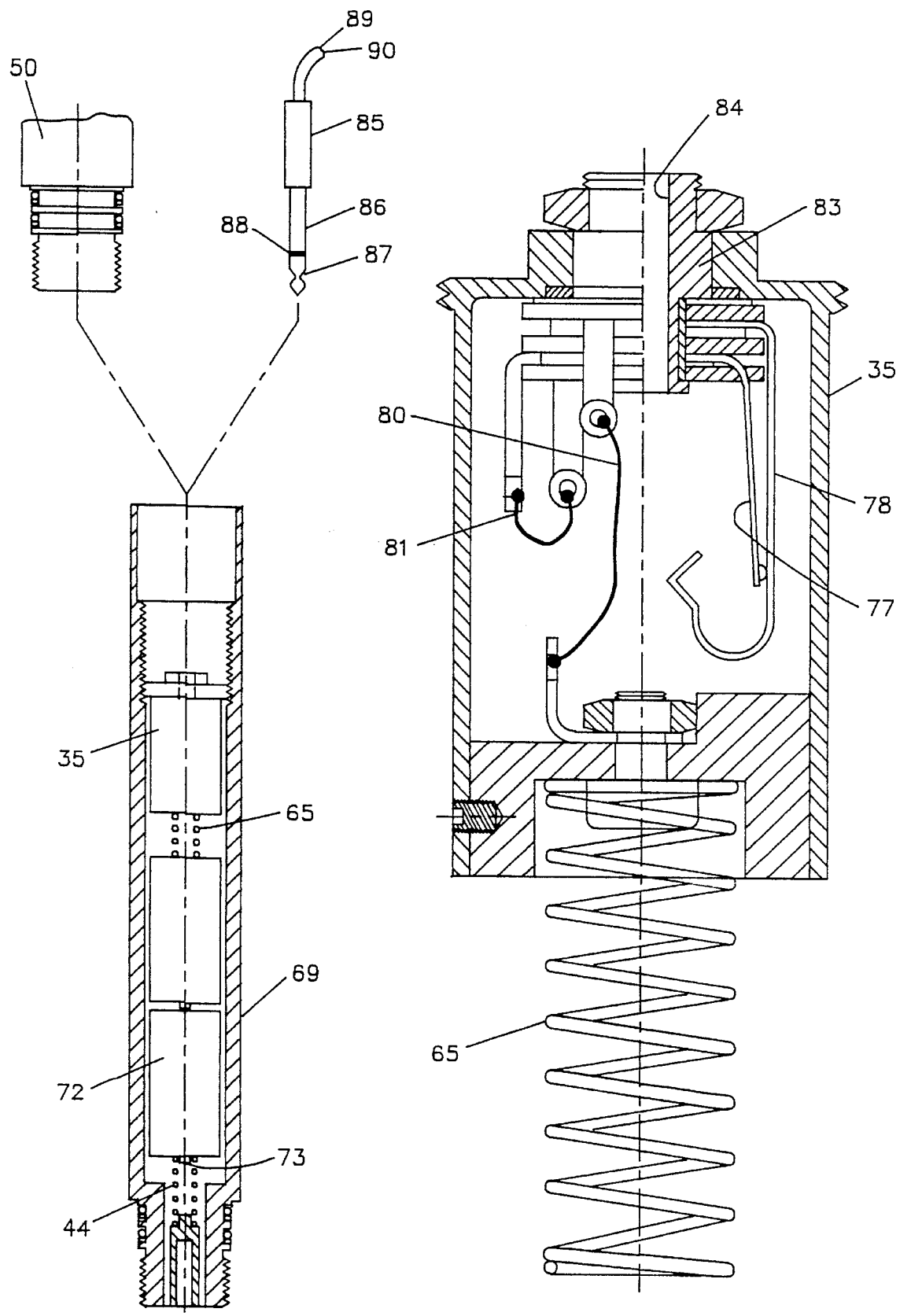
FIG. 3 illustrates a housing section for a battery pack.
FIG. 4 illustrates a phone jack.

Referring now to FIG. 3, in the present invention the battery sub or upper end of the housing 34 includes a metal tubular member 69 with threaded ends for sealed connection to the communication housing 50 and to the tool housing 34. The lower end of the member 69 is connected to the tool housing 34 which provides a common electrical ground for the well tool. The member 69 has an upper threaded end which is connectable to the circuit housing 50. As illustrated, the housing 50 can be received in a sealing connection with the member 69. In the hollow interior of the member 69 are a number of in-line d.c. dry cell batteries 72 which are series connected with a positive terminal 73 connectable to the power supply of the well tool. A coiled spring 65 in abutting engagement with an end battery 45 of the linear array of batteries is utilized to maintain the batteries in the battery pack in contact with one another.

At the upper end of the battery pack is a phone jack 35 (see FIG. 4) which is mounted in the internally threaded upper end of the member 69. The phone jack 35, as shown in FIG. 4, is a conventional item which has spring contact members 77, 78 normally in contact with one another. The contact 78 is electrically connected to a conductor 80 which, in turn connects to the negative pole of the battery pack.

The contact 78 is electrically connected to a conductor 81 which, connects to an inner tubular metal member 83 with a central bore 84 in the jack 35. The tubular member 83 is also electrically grounded on the housing sub 69. The contact 78 and the contact 77 when in engagement with one another connect the negative pole of the battery pack to the housing of sub 69 as the common electrical ground.

As shown in FIG. 3, a phone plug 85 has two electrodes 86, 87 which are separated from one another by insulation 88 and are connected to separate leads 89, 90. When the phone plug 85 is inserted into the bore 84 of the phone jack 35, the electrode 87 engages contact 78 and mechanically opens the contacts 77 and 78 breaking the electrical continuity and connecting the electrode 87 (and conductor 89) to the conductor 89 and the negative terminal of the battery pack. At the same time the electrode 86 contacts the bore 84 of the phone jack 52 so that the conductor 90 is connected to the electrical ground of the housing 69.

Referring now to FIG. 5, the housing sub 34 is illustrated with a battery pack 33 where the positive terminal 91 provides voltage for a current signal generator 92, a voltage discriminator 93 and the voltage regulator 36. The voltage regulator 36 furnishes voltage to the CPU 38 and other circuits and has a return to the electrical ground housing 34. A communication means is defined by a current signal generator 92 and a voltage discriminator 93. The CPU has instructions and is programmed such that an applied voltage above a preselected level places the voltage discriminator 93 in a transmission mode and transmits instruction data to the CPU 38 with a constant voltage. The current signal generator 92 is responsive to current modulation to output collected data in the memory bank. The data collection system in the memory bank is arranged to operate with 20 volts or less and a voltage range of 22.5 to 30 volts is used for the communication or transmission mode.

An external control device or controller 95 is shown in FIG. 6 and can be a hand held controller with a keyboard 97, and a L.C.D. display 98 has a program memory card slot 99 to receive a memory card. In the controller 95, as shown in FIG. 5 are batteries 100 for power, a current sensing circuit 103, an adjustable voltage regulator 104, a CPU 106, a clock 108, a battery voltage meter 110 and a switching means 112. In the switching means 112 are three serially connected switches SW #1, SW #2 and SW #3, which are single pole single throw electronic switches which are controlled by the CPU 106.

When the phone plug 85 is inserted into the phone jack 35, the negative terminal 113 of the battery pack 33 is connected to the phone plug 87 contact to the conductor 89 of the phone plug 85. The tubular housing 83 which is at electrical ground for the system is connected to the conductor 90 of the phone plug 85. The mechanical switch contacts 77 and 78 are opened which disconnects the negative terminal 113 of the battery pack 33 from the housing 60.

In the initial condition of the controller 95, the switch #1 is open while the switch #2 and the Switch #3 are closed. Switch #1 is open and prevents the adjustable voltage regulator 104 in the controller from shorting to ground. With closed switches #2 and #3, the phone plug 85 connects the conductor 90 (battery ground) via switches #2 and #3 to the conductor 89 and the negative terminal 113 of the battery 33.

Data communications are initiated by activating the external CPU 106 in the controller 95. Upon activating the controller CPU, the switch #3 is opened. The negative terminal 113 of the battery 33 is then connected to a voltage meter 110 by a conductor 120 while the positive terminal 91 of the battery 33 is connected to the voltage meter 110 through the voltage regulator 36 and the CPU 38 because the impedance of the CPU 61 and other circuit is much less than the impedance of the voltage meter 110 so the positive voltage of the battery pack 33 is essentially applied to the meter 110 and also supplied as a data input to the CPU 106. It may also be displayed on the L.C.D. 98 as shown in FIG. 6. If the battery pack 33 is not connected, a voltage of zero will be read by the meter 110.

The external CPU 106 of the controller then sets the output of the adjustable voltage regulator 104 to the communications voltage level (approximately 26 volts) minus the battery voltage of battery pack 33. This CPU control instruction sent via a conductor 124 sequentially opens the switch #2 to disconnect the negative terminal 113 of the battery 33 from the housing ground and closes the switch #1 to apply the voltage of the voltage regulator 104 to the negative terminal 113 of the battery 33. The voltage meter 110 again measures the voltage at the positive battery terminal 91. This time the voltage read by the CPU 106 in the controller is the battery voltage of battery 33 plus the regulated voltage from the voltage regulator 104. If it is not close to 26 volts, the CPU 104 adjusts the voltage of the voltage regulator 104 until it is. When the regulated voltage level of the adjustable voltage regulator 104 reaches 26 volts, the switch #3 is closed to apply the regulated voltage of 26 volts to the CPU 38 in the tool.

The CPU 106 of the controller is used to send data instructions to the CPU 38 using a voltage binary transmit signal generated by the adjustable voltage regulator 104. Modulating the transmit signal between a logic "0" and a logic "1" causes the adjustable voltage regulator 104 to modulate the voltage applied to the CPU 38.

When an instruction causes the CPU 38 to transmit data from its memory, the current signal generator 92 in the tool is modulated to produce current signals between a logic "0" and a logic "1". The current signals are sensed in the controller 95 by the current sensing circuit 102 and are transmitted as data to the CPU and its memory.

Referring now to FIG. 7, in the circuit housing 50, a voltage regulator 120 is connected between the conductor 131 of the cable 137 and a phone plug 132 which connects to the phone jack 35 in the housing 69. The connecting wire 135 between the voltage regulator 130 and the phone plug 132 is connected by a diode 136 to the common electrical housing ground. The cable 137 has a central conductor wire 131 which is electrically insulated from an outer ground conductor. In the event of failure of the voltage regulator 130 or the cablehead 20, the diode 130 provides an electrical ground return.

At the earth's surface, the conductor 131 has a resistor 140 and a read out which includes a recording means 141 which detects and records the current modulation in the conductor. A d.c. power source 143 of about 30 volts is the surface power which source provides downhole in the communication housing, a regulated 8 volts from the voltage regulator 130 to the battery pack 33. The battery pack is set to provide a voltage of slightly less than the 22 volts required to operate the communications mode and the voltage regulator 130 provides the additional voltage to operate the communications mode of the tool.

In operation, the operator assembles the tool with the sensors, electronics and battery pack at the earth's surface. Then, before attaching the connector head and the communications housing, the controller phone plug 85 is plugged into the phone jack 84. When the "start" command is initiated in the hand held controller 95, the controller 95 checks the battery voltage of the battery pack 33. If the battery voltage is correct the operator knows that the battery pack is functioning and the tool operation can be checked out by a data instruction program sent by the controller 95 to the tool CPU for execution. After the tool is checked out functionally, the operator goes to the communications mode and sends data instructions to the CPU 38 on the sampling or tests to be conducted downhole and sets the clock 36 in the tool. Included in the instructions is a SRO command to activate the current signal generator 92 after an initial time delay or time window to transmit in a cable communication mode. With the time delay, the CPU can receive instructions for subsequent data retrieval and reprogramming. The tool is assembled and run in the hole for testing operation (which may be over an extended period of time such as days or more).

With the tool in the well bore, the collected data is communicated to the surface read out 141 by virtue of the voltage regulator 130 adjusting the voltage level in the well tool to the communicate mode and where the CPU 38 instructs the signal generator 92 to communicate. When the tool is utilized, it will automatically transmit data because the communicate mode is activated and the MRO will transmit continuously. Thus, the operator receives both surface readings and confirmation that the tool is functioning. Should the cablehead 20 electrically malfunction and disable the voltage regulator 130, the battery pack 33 continues to operate and data collection will continue.

When the tool is retrieved, the connector head and communication housing 50 are removed and the phone plug 85 of the controller 95 is plugged into the phone jack 35. The controller checks the battery voltage and places the tool CPU 39 in a communications mode where instructions can be entered by the operation of the voltage regulator 104. The tool CPU 39 can respond with output of the logged data of the measured parameters in the well bore by operation of the current signal generator 92. The controller then decodes the transmitted data by operation of the current sensing circuit 102 and displays the data in the L.C.D. 98 and records the data in the proper memory card. Remote control or collection of data also can be made by a use of a compatible P.C. The clock 36 is automatically reset with the clock 108 in the controller. By use of the controller and the program memory card the operator need only understand which buttons to push since the testing program can be designed and installed on a program memory card by an engineer at a remote location.

It will be apparent to those skilled in the art that various changes may be made in the invention without departing from the spirit and scope thereof and therefore the invention is not limited by that which is disclosed in the drawings and specifications but only as indicated in the appended claims.

I claim:

1. A well tool for obtaining pressure data in a well bore and including;

a pressure sealed housing for enclosing a pressure transducer, a CPU, a memory means and a communications means where said memory means, in response to instructions from said CPU, obtains pressure data from said pressure transducer and stores said pressure data in the memory means as a function of time, and where said pressure transducer, said CPU and said memory means are powered by a tool d.c. power supply having an operating voltage below a given voltage level and where said communication means is responsive to an additional voltage applied in series with said d.c. power supply for the input of instruction data to said CPU and the output of pressure data from said memory means; and a pressure communications housing attachable to said pressure housing, said pressure communications housing enclosing a voltage regulator means for supplying an additional d.c. voltage to said tool d.c. power supply for actuating said communication means.

2. The apparatus as set forth in claim 1 and further including in said pressure housing, a phone jack outlet and including in said communications housing, a phone plug connector for electrically interconnecting the voltage regulator means to said d.c. power supply.

3. The apparatus as set forth in claim 1 wherein said communications means includes a voltage discriminator for detecting of input data instructions representative of digital signals and a current modulator for developing digital signals representative of output pressure data.

4. The apparatus as set forth in claim 1 and further including:

a surface d.c. power supply;

cable means with a pair of electrical conductor paths for coupling said voltage regulator means to said surface d.c. power supply at the earth's surface so that the well tool can obtain and store pressure data in the well tool while said well tool is independently functioning with said tool d.c. power supply and can transmit pressure data from the well tool to the earth's surface when the surface d.c. power supply supplies additional d.c. voltage to said tool d.c. power supply to raise the voltage above said given voltage level.

5. The apparatus as set forth in claim 4 and further including surface recording means for recording transmitted pressure data.

6. A method for obtaining pressure data in a well bore with a well tool having an pressure housing for enclosing a pressure transducer, a CPU, a memory means and a communications means where said memory means stores pressure data in the memory means as a function of time, and where said pressure transducer, said CPU and said memory means are powered by voltage from a tool d.c. power supply operating below a given voltage level and where the communication means responds to a voltage above said given voltage level in a transmission mode for the input of instruction data to said CPU and for the output of data from said memory means, and where a pressure communications housing is attached to said pressure housing and has a voltage regulator means for supplying an additive d.c. voltage to said d.c. power supply to place said communication means in said transmission mode;

the method including the steps of:

locating the well tool in a well bore on a cable extending from the earth's surface and having at least two conductors;

sensing pressure parameters in the well bore with the pressure transducer in the well tool and storing said pressure parameters in the memory means;

supplying a additive d.c. voltage to said voltage regulator means from the earth's surface via said two conductors to raise the applied voltage in said tool above said given voltage level for transmitting pressure data from the well tool to the earth's surface via the two conductors in the cable;

said storing of said pressure parameters in the memory means being independent from transmitting the pressure data to the earth's surface; and applying the voltage of the tool d.c. power supply to the CPU and the memory means in the well tool independently of the d.c. voltage from the earth's surface.

7. The method as set forth in claim 6 and further including:

programming the CPU in the well tool at the earth's surface to actuate the communication means to transmit pressure data when an additive voltage is supplied to the tool d.c. power supply in the well tool above said given voltage level.

8. The method as set forth in claim 6 and further including the step of converting said pressure data in digital format for transmission to the earth's surface.

9. The method as set forth in claim 8 and further including the step of modulating current to convert said pressure data into a digital format.

10. The apparatus as set forth in claim 1 wherein said voltage regulator means also includes a diode for an electrical ground return path in the event the voltage regulator means ceases to supply the additional d.c. voltage.

* * * * *